(12) United States Patent
Kippie et al.

(10) Patent No.: US 6,784,140 B2
(45) Date of Patent: Aug. 31, 2004

(54) THERMALLY STABLE, SUBSTANTIALLY WATER-FREE WELL FLUID

(75) Inventors: David P. Kippie, Katy, TX (US); William E. Foxenberg, Houston, TX (US)

(73) Assignee: M-I L.L.C., Houston, TX (US)

( * ) Notice: Subject to any disclaimer, the term of this patent is extended or adjusted under 35 U.S.C. 154(b) by 134 days.

(21) Appl. No.: 09/930,063

(22) Filed: Aug. 15, 2001

(65) Prior Publication Data

US 2003/0075331 A1 Apr. 24, 2003

(51) Int. Cl.$^7$ ................................................ C09K 7/00
(52) U.S. Cl. .................. 507/136; 507/110; 507/111; 507/112; 507/113; 507/114; 507/115; 507/118; 507/119; 507/120; 507/139; 507/209; 507/211; 507/212; 507/213; 507/214; 507/215; 507/216; 507/217; 507/219; 507/221; 507/224; 507/225; 507/261; 507/266
(58) Field of Search ................. 507/110–115, 118–120, 507/136, 139, 209, 211, 212, 213, 214–217, 219, 221, 224, 225, 261, 266

(56) References Cited

U.S. PATENT DOCUMENTS

| | | | | |
|---|---|---|---|---|
| 4,498,994 A | | 2/1985 | Heilweil | ................. 252/8.5 M |
| 4,567,947 A | * | 2/1986 | Mzik | ........................... 507/139 |
| 5,552,377 A | * | 9/1996 | Kindred | ...................... 507/209 |
| 5,785,747 A | * | 7/1998 | Vollmer | ...................... 507/110 |
| 6,451,743 B1 | * | 9/2002 | Fox | ............................ 507/110 |
| 6,489,270 B1 | * | 12/2002 | Vollmer | ...................... 507/261 |

FOREIGN PATENT DOCUMENTS

| | | | | |
|---|---|---|---|---|
| WO | WO 96/19545 | | 6/1996 | ........... C09K/7/06 |
| WO | WO 97/10313 | | 3/1997 | ........... C09K/7/06 |
| WO | WO 02/40612 A1 | | 5/2002 | ........... C09K/7/06 |

OTHER PUBLICATIONS

International Search Report dated Jan. 24, 2003, 2 pages.
International Search Report dated Jan. 24, 2003, 2 pages.

* cited by examiner

Primary Examiner—Philip C. Tucker
(74) Attorney, Agent, or Firm—Osha & May L.L.P.

(57) ABSTRACT

A method of treating a well including injecting a thermally stable, substantially water-free well-treating fluid into the well, wherein the well-treating fluid comprises a polymer, a glycol compound, and a salt is disclosed. In another embodiment, a thermally stable, substantially water-free well fluid including a polymer, a diol compound, and a salt is disclosed.

16 Claims, No Drawings

THERMALLY STABLE, SUBSTANTIALLY WATER-FREE WELL FLUID

BACKGROUND OF INVENTION

1. Field of the Invention

The invention relates generally to the exploitation of hydrocarbon-containing formations. More specifically, the invention relates to the fields of fluid rheology, thickeners, viscosifiers, viscoelastic fluids, drilling fluids, well fracturing fluids, well treatment fluids and fluid control pills.

2. Background Art

When drilling or completing wells in earth formations, various fluids typically are used in the well for a variety of reasons. The fluid often is aqueous. For the purposes herein, such fluid will be referred to as "well fluid." Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, implacing a packer fluid, abandoning the well or preparing the well for abandonment, and otherwise treating the well or the formation. Brines (such as $CaBr_2$) commonly are used as well fluids because of their wide density range and the fact that brines are typically substantially free of suspended solids. Additionally, brines typically do not damage certain types of downhole formations.

A variety of compounds typically are added to brine-based well fluids. For example, a brine-based well fluid also may include corrosion inhibitors, lubricants, pH control additives, surfactants, solvents, and/or weighting agents, among other additives. Some typical brine-based well fluid viscosifying additives include natural polymers and derivatives such as xanthan gum and hydroxyethyl cellulose (HEC).

Some synthetic polymer and oligomer additives such as poly(ethylene glycol)(PEG), poly(diallyl amine), poly(acrylamide), poly(aminomethylpropylsulfonate[AMPS]), poly(acrylonitrile), poly(vinyl acetate), poly(vinyl alcohol), poly(vinyl amine), poly(vinyl sulfonate), poly(styryl sulfonate), poly(acrylate), poly(methyl acrylate), poly(methacrylate), poly(methyl methacrylate), poly(vinylpyrrolidone), poly(vinyl lactam) and co-, ter-, and quater-polymers of the following co-monomers: ethylene, butadiene, isoprene, styrene, divinylbenzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, and vinyl lactam are also often used.

The polymers and oligomers listed above have other uses in drilling applications as well. When drilling progresses to the level of penetrating a hydrocarbon bearing formation, special care may be required to maintain the stability of the wellbore. Examples of formations in which problems often arise are highly permeable and/or poorly consolidated formations. In these types of formations, a technique known as "under-reaming" may be employed.

In this process, the wellbore is drilled to penetrate the hydrocarbon bearing zone using conventional techniques. A casing generally is set in the wellbore to a point just above the hydrocarbon bearing zone. The hydrocarbon bearing zone then may be re-drilled, for example, using an expandable under-reamer that increases the diameter of the wellbore. Under-reaming usually is performed using special "clean" drilling fluids. Typical drilling fluids used in under-reaming are expensive, aqueous, dense brines that are viscosified with a gelling and/or cross-linked polymer to aid in the removal of formation cuttings. The high permeability of the target formation, however, may allow large quantities of the drilling fluid to be lost into the formation.

Once the drilling fluid is lost into the formation, it becomes difficult to remove. Calcium and zinc-bromide brines can form highly stable, acid insoluble compounds when reacted with the formation or substances contained therein. This reaction may reduce the permeability of the formation to any subsequent out-flow of the targeted hydrocarbons. The most effective way to prevent such damage to the formation is to limit fluid loss into the formation.

Thus, providing effective fluid loss control is highly desirable to prevent damaging the formation in, for example, completion, drilling, drill-in, displacement, hydraulic fracturing, work-over, packer fluid implacement or maintenance, well treating, or testing operations. Techniques that have been developed to control fluid loss include the use of fluid loss "pills." Significant research has been directed to determining suitable materials for the fluid loss pills, as well as controlling and improving the properties of the fluid loss pills. Typically, fluid loss pills work by enhancing filter-cake buildup on the face of the formation to inhibit fluid flow into the formation from the wellbore.

Because of the high temperatures, high shear (caused by the pumping and placement), high pressures, and low pH to which well fluids are often exposed (i.e., "stress conditions"), the above described polymeric materials used to form fluid loss pills, and to viscosify the well fluids, tend to degrade rather quickly. It is believed that the water found in these aqueous systems may catalyze the degradation of the polymeric materials used in well fluid applications. Thus, reducing the amount of water in a given well fluid is important for improving the thermal durability of well fluids.

What is needed are well fluids that can withstand stress conditions for extended periods of time without significant degradation. In particular, what is needed is a simple, inexpensive way to increase the temperature range for viscosifying agents used in downhole applications. Preferably, such a thermal extender would be operable in the absence of water.

SUMMARY OF INVENTION

In one aspect, the present invention relates to a method of treating a well including injecting a thermally stable, substantially water-free well-treating fluid into the well, wherein the well-treating fluid comprises a polymer, a glycol compound, and a salt.

In another aspect, the present invention relates to a thermally stable, substantially water-free well fluid including a polymer, a diol compound, and a salt.

Other aspects and advantages of the invention will be apparent from the following description and the appended claims.

DETAILED DESCRIPTION

The present invention relates to a novel composition for increasing fluid loss control in downhole applications. Further, the present invention relates to increasing the thermal stability of well fluids by using an effective amount of glycol compound in the well fluid. Preferably, the glycol compound allows the use of a substantially water-free well fluid system. Effective simply means an amount sufficient to effect control of fluid loss by a measurable amount. The desired amount of polymer and salt is added directly to the glycol compound, so that additional water is not required.

In general, the present invention relates to compositions for the creation of, and methods of using fluid loss control pills and similar fluids that can sustain stress conditions for extended periods of time without significant fluid loss or loss of desirable rheological properties. The stress conditions may include, for example, exposure to high shear in pumping and placement, exposure to oxidizing breakers (including oxygen dissolved in the fluid), exposure to brines having high divalent cation content, high temperature, high differential pressure, low pH, extended time, and a combination of two or more of such stress conditions. These pills and fluids are advantageously applied in or in connection with drilling, drill-in, displacement, completion, hydraulic fracturing, work-over, packer fluid implacement or maintenance, well-treating, testing, or abandonment.

The present invention includes a novel composition for increasing the thermal durability of substantially water-free system containing an polymer and oligomer systems used in downhole applications. In general, the invention, in one embodiment, involves the effect of ethylene glycol on a conventional liquid viscosifier, such as hydroxyethyl cellulose (HEC). HEC is a derivative of cellulose, where some or all of the pendant hydroxyl moieties have been replaced with hydroxyethyl ether groups. The presence of these long side chains prevent the individual polymer strands from aligning and crystallizing, which allows HEC to be water-soluble. The general structure of a cellulose polymer is shown below.

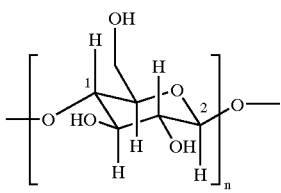

Eq. 1

The effects of high temperatures for long periods of time were measured on a substantially water-free, glycol fluid loss control pill according to a first embodiment of the invention. Specifically, 4.78 lab barrels (Lbbl) of dry HEC was added to a 0.956 Lbbl of water-free ethylene glycol. To this mixture, 10.5 pounds per barrel of potassium chloride (KCl) was added. Because the HEC and KCl are added as "dry" reagents, the amount of water present in the mixture is minimized. Of course, some water is absorbed from the atmosphere, and some water is present in the ethylene glycol. Note that throughout the specification, the term "lab barrel" is used as a unit of volume. A lab barrel is equivalent to about 350 milliliters. Additionally, while a particular order of addition for the chemical components is presented herein, such a description of the order of addition of the components is not intended to limit the scope of the invention in any fashion.

After mixing the components, initial rheological parameters were measured. The rheological measurements were made using a Fann model 35 rotational viscometer (manufactured by Fann Instrument Co., of Houston, Tex.), using a B1 bob on a "2 times" spring. Specifically, the apparent viscosity was measured. Viscosity is the ratio of the shear stress to the shear rate and is an indication of flow resistance. For many fluids, apparent viscosity changes for different values of shear rate, and is measured in centipoise (cP). Shear rate is measured in RPM or $sec^{-1}$.

In this embodiment, the initial apparent viscosity of the KCl/glycol/HEC mixture was measured at six different shear rates: 600 rpm, 300 rpm, 200 rpm, 100 rpm, 6 rpm, and 3 rpm. The mixture was then placed in an oven at 290° F. After 16 hours, the mixture was removed from the oven and allowed to cool to room temperature. After reaching room temperature, the apparent viscosity of the mixture was again measured. After taking the measurement, the mixture was returned to the oven for an additional 16 hours at 290° F. Measurements of the apparent viscosity were again taken after the mixture was allowed to cool to room temperature. The mixture was then returned to the oven for an additional 16 hours at 290° F., after which the sample was allowed to cool and apparent viscosity measurements were again taken. The mixture was returned to the oven for 24 hours at 290° F., allowed to cool and final apparent viscosity measurements were then taken.

The results are summarized in the table below:

TABLE 1

ETHYLENE GLYCOL PRESENT (APPARENT VISCOSITY)

| Shear Rate (RPM) | Initial | 16 Hrs | 32 Hrs | 48 Hrs | 72 Hrs |
|---|---|---|---|---|---|
| 600 | 524 | 510 | 612 (estimated) | 617 (estimated) | 540 |
| 300 | 370 | 420 | 560 | 530 | 430 |
| 200 | 308 | 380 | 440 | 462 | 388 |
| 100 | 222 | 320 | 362 | 376 | 322 |
| 6 | 68 | 176 | 188 | 186 | 160 |
| 3 | 50 | 148 | 158 | 158 | 110 |

Table 1 shows that the apparent viscosity of the KCl/glycol/HEC mixture remained roughly constant during the entire 72 hour heat treatment. Based on this result, it is apparent that the HEC polymer suffered no significant degradation during the entire 72 hour experiment when included with glycol in a substantially water-free mixture.

For comparison, an experiment was run under conditions similar to those described above without the addition of glycol. That is, 5 grams of HEC were added to a 3% weight KCl solution in water and placed in a 250° F. oven for 21 hours and 41 hours.

Again, the initial apparent viscosity of the KCl/HEC mixture was measured at six different shear rates: 600 rpm, 300 rpm, 200 rpm, 100 rpm, 6 rpm, and 3 rpm. In addition, the initial pH was measured., the KCl/HEC mixture was placed in a oven at 250° F. and measurements were taken after hours, each time after the mixture was allowed to cool to room temperature.

The results are summarized in the table below:

TABLE 2

COMPARATIVE RUN, GLYCOL ABSENT (APPARENT VISCOSITY)

| Shear Rate (RPM) | Initial | 21 Hrs | 41 Hrs |
|---|---|---|---|
| 600 | 320 | 170 | 48 |
| 300 | 274 | 104 | 24 |
| 200 | 244 | 82 | 16 |
| 100 | 222 | 48 | 10 |

TABLE 2-continued

COMPARATIVE RUN, GLYCOL ABSENT (APPARENT VISCOSITY)

| Shear Rate (RPM) | Initial | 21 Hrs | 41 Hrs |
|---|---|---|---|
| 6 | 76 | 4 | 4 |
| 3 | 56 | 2 | 2 |

As shown in Table 2, absent glycol, viscosity reduction becomes significant at the times/temperatures associated with this experiment. For example, a dramatic loss in viscosity occurred within 21 hours into the experiment.

While the foregoing embodiment references a limited number of compounds, it should be recognized that chemical compounds having the same general characteristics also will function in an analogous fashion. For example, it is expressly within the scope of the present invention that other compounds containing primary, secondary, or tertiary alcohols may be used, such as, for example, diethylene glycol, triethylene glycol, and other glycol derivatives like diethylene glycol methylether, diethylene glycol ethylether, triethylene gylcol methylether, and triethylene glycol ethylether, glycerol and glycerol derivatives like glycerol formal, glycerol 1,3 diglycerolate, glyceroethoxylate, 1,6, hexandiol, and 1,2 cyclohexandiol.

In addition, other natural and natural derivative polymers may be substituted for HEC, such as, for example, starch, derivatized starch, whelan gum, guar gum, Sclerogulan or xanthan gum. Similarly, synthetic polymers may be substituted for HEC, such as, for example, poly(acrylonitrile), poly(acetates), and other synthetic polymers known in the art. Furthermore, it should be noted that while most of the above examples discuss the utility of glycol with KCl, it will be clear to one of ordinary skill in the art that other salts, such as $ZnCl_2$, $CaBr_2$, and $ZnBr_2$, NaCl, $CaCl_2$, $NH_4Cl$, $MgCl_2$, NaBr, $Na_2S_2O_3$, and combinations thereof may be used.

Further, the present invention is not limited to use as a fluid loss control system. Other applications of the system are expressly within the scope of the application, including, for example, as a drilling fluid system or for work-over operations, such as sweeps (systems that are pumped downhole to clean-out sand or drill cuttings).

One proposed mechanism for how the addition of glycol provides additional thermal stability is based on the belief that the removal of water reduces the mechanisms by which the polymers may degrade. Because HEC is derived from cellulose, many of the reactions that are associated with cellulose are relevant to the chemistry of HEC and other related biopolymers (such as starch). Specifically, acid catalyzed hydrolysis can cause degradation of cellulose. Acids (which may be present in downhole formations for any one of a number of reasons, such as, for example, the release of acid gases such as $H_2S$) attack the acetal linkages, cleaving the 1–2 glycosidic bond, as labeled in Equation 1. The carbon atom labeled 2 in Equation 1 may be considered an acetal. Generally speaking, an acetal is simply a diether in which both ether oxygens are bound to the same carbon. Acetals typically are much more stable toward alkali and, base-catalyzed hydrolysis is much less likely to occur. Thus, by removing water from the system, acidic brine solutions are not formed or are not formed to such an extent as when water is predominant, reducing the likelihood for acid catalyzed degradation.

The present invention advantageously increases the effective temperature range for polymer systems in an inexpensive, easy-to-implement method. The addition of glycol compounds and/or derivatives into the polymer system dramatically increases the temperature resistance of the solution and enhances the overall stability of the system. In addition, the present invention specifically contemplates that the above described compositions may be used to treat a well.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A thermally stable, substantially water-free well fluid comprising:

a viscosifying polymer;

a glycol compound comprising at least one selected from diethylene glycol methylether, diethylene glycol ethylether, triethylene glycol methylether, and triethylene glycol ethylether; and a salt.

2. A thermally stable, substantially water-free well fluid comprising:

a polymer; a glycol compound comprising at least one selected from diethylene glycol methylether, diethylene glycol ethylether, triethylene glycol methylether, and triethylene glycol ethylether; and a salt, wherein the polymer comprises at least one selected from the group consisting of hydroxyethyl cellulose, derivatized cellulose, starch, derivatized starch, whelan gum, whelan gum derivatives, scleroglucan, scleroglucan derivatives, guar gum, guar derivatives, xanthan gum and xanthan gum derivatives.

3. A thermally stable, substantially water-free well fluid comprising:

a polymer; a glycol compound comprising at least one selected from diethylene glycol methylether, diethylene glycol ethylether, triethylene glycol methylether, and triethylene glycol ethylether; and a salt, wherein the polymer comprises at least one selected from the group consisting of poly(ethylene glycol), poly(diallyl amine), poly(acrylamide), poly(aminomethylpropylsulfonate), poly(acrylonitrile), poly(vinyl acetate), poly(vinyl alcohol), poly(vinyl amine), poly(vinyl sulfonate), poly(styryl sulfonate), poly(acrylate), poly(methyl acrylate), poly(methacrylate), poly(methyl methacrylate), poly(vinylpyrrolidone), poly(vinyl lactam), co-, ter-, and quater-polymers of the following co-monomers: ethylene, butadiene, isoprene, styrene, divinylbenzene, divinyl amine, 1,4-pentadiene-3-one (divinyl ketone), 1,6-heptadiene-4-one (diallyl ketone), diallyl amine, ethylene glycol, acrylamide, poly(aminomethylpropylsulfonate), acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, and vinyl lactam.

4. The well fluid of claim 1, wherein the salt comprises at least one selected from the group consisting of KCl, $ZnCl_2$, $CaBr_2$, $ZnBr_2$, NaCl, $CaCl_2$, $NH_4Cl$, $MgCl_2$, NaBr, and $Na_2S_2O_3$.

5. A thermally stable, substantially water-free well fluid comprising:

a viscosifying polymer;

an alcohol compound comprising glyceroethoxylate; and a salt.

6. The well fluid of claim 5, wherein the viscosifying polymer comprises at least one selected from the group consisting of hydroxyethyl cellulose, derivatized cellulose, starch, derivatized starch, whelan gum, whelan gum derivatives, scleroglucan, scleroglucan derivatives, guar gum, guar derivatives, xanthan gum and xanthan gum derivatives.

7. The well fluid of claim 5, wherein the viscosifying polymer comprises at least one selected from the group consisting of poly(ethylene glycol), poly(diallyl amine), poly(acrylamide), poly(aminomethylpropylsulfonate), poly(acrylonitrile), poly(vinyl acetate), poly(vinyl alcohol), poly(vinyl amine), poly(vinyl sulfonate), poly(styryl sulfonate), poly(acrylate), poly(methyl acrylate), poly(methacrylate), poly(methyl methacrylate), poly(vinylpyrrolidone), poly(vinyl lactam), co-, ter-, and quater-polymers of the following co-monomers: ethylene, butadiene, isoprene, styrene, divinylbenzene, divinyl amine, 1,4-pentadiene-3-one (divinyl ketone), 1,6-heptadiene-4-one (diallyl ketone), diallyl amine, ethylene glycol, acrylamide, poly(aminomethylpropylsulfonate), acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, and vinyl lactam.

8. The well fluid of claim 5, wherein the salt comprises at least one selected from the group consisting of KCl, $ZnCl_2$, $CaBr_2$, $ZnBr_2$, NaCl, $CaCl_2$, $NH_4Cl$, $MgCl_2$, NaBr, and $Na_2S_2O_3$.

9. A method of treating a well comprising:

injecting a thermally stable, substantially water-free well-treating fluid into the well, wherein the well-treating fluid comprises a viscosifying polymer, a glycol compound comprising at least one selected from diethylene glycol methylether, diethylene glycol ethylether, triethylene glycol methylether, and triethylene glycol ethylether, and a salt.

10. A method of treating a well comprising: injecting a thermally stable, substantially water-free well-treating fluid into the well, wherein the well-treating fluid comprises a polymer, a glycol compound comprising at least one selected from diethylene glycol methylether, diethylene glycol ethylether, triethylene glycol methylether, and triethylene glycol ethylether, and a salt, wherein the polymer comprises at least one selected from the group consisting of hydroxyethyl cellulose, derivatized cellulose, starch, derivatized starch, whelan gum, whelan gum derivatives, scleroglucan, scleroglucan derivatives, guar gum, guar derivatives, xanthan gum and xanthan gum derivatives.

11. The method of claim 9, wherein the salt comprises at least one selected from the group consisting of KCl, $ZnCl_2$, $CaBr_2$, $ZnBr_2$, NaCl, $CaCl_2$, $NH_4Cl$, $MgCl_2$, NaBr, and $Na_2S_2O_3$.

12. A method of treating a well comprising:

injecting a thermally stable, substantially water-free well-treating fluid into the well, wherein the well-treating fluid comprises a viscosifying polymer, an alcohol compound comprising glyceroethoxylate, and a salt.

13. The method of claim 12, wherein the viscosifying polymer comprises at least one selected from the group consisting of hydroxyethyl cellulose, derivatized cellulose, starch, derivatized starch, whelan gum, whelan gum derivatives, scleroglucan, scleroglucan derivatives, guar gum, guar derivatives, xanthan gum and xanthan gum derivatives.

14. The method of claim 12, wherein the viscosifying polymer comprises at least one selected from the group consisting of poly(ethylene glycol), poly(diallyl amine), poly(acrylamide), poly(axninomethylpropylsulfonate), poly(acrylonitrile), poly(vinyl acetate), poly(vinyl alcohol), poly(vinyl amine), poly(vinyl sulfonate), poly(styryl sulfonate), poly(acrylate), poly(methyl acrylate), poly(methacrylate), poly(methyl methacrylate), poly(vinylpyrrolidone), poly(vinyl lactam), co-, ter-, and quater-polymers of the following co-monomers: ethylene, butadiene, isoprene, styrene, divinylbenzene, divinyl amine, 1,4-pentadiene-3-one (divinyl ketone), 1,6-heptadiene-4-one (diallyl ketone), diallyl amine, ethylene glycol, acrylamide, poly(aminomethylpropylsulfonate), acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, and vinyl lactam.

15. The method of claim 12, wherein the salt comprises at least one selected from the group consisting of KCl, $ZnCl_2$, $CaBr_2$, $ZnBr_2$, NaCl, $CaCl_2$, $NH_4Cl$, $MgCl_2$, NaBr, and $Na_2S_2O_3$.

16. A method of treating a well comprising: injecting a thermally stable, substantially water-free well-treating fluid into the well, wherein the well-treating fluid comprises a polymer, a glycol compound comprising at least one selected from diethylene glycol methylether, diethylene glycol ethylether, triethylene glycol methylether, and triethylene glycol ethylether, and a salt, wherein the polymer comprises at least one selected from the group consisting of poly(ethylene glycol), poly(diallyl amine), poly(acrylamide), poly(aminomethylpropylsulfonate), poly(acrylonitrile), poly(vinyl acetate), poly(vinyl alcohol), poly(vinyl amine), poly(vinyl sulfonate), poly(styryl sulfonate), poly(acrylate), poly(methyl acrylate), poly(methacrylate), poly(methyl methacrylate), poly(vinylpyrrolidone), poly(vinyl lactam), co-, ter-, and quater-polymers of the following monomers: ethylene, butadiene, isoprene, styrene, divinylbenzene, divinyl amine, 1,4-pentadiene-3-one (divinyl ketone), 1,6-heptadiene-4-one (diallyl ketone), diallyl amine, ethylene glycol, acrylamide, poly(aminomethylpropylsulfonate), acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, and vinyl lactam.

* * * * *